(12) United States Patent
Li et al.

(10) Patent No.: US 10,649,664 B2
(45) Date of Patent: *May 12, 2020

(54) METHOD AND DEVICE FOR SCHEDULING VIRTUAL DISK INPUT AND OUTPUT PORTS

(71) Applicant: Alibaba Group Holding Limited, George Town (KY)

(72) Inventors: Xiaobo Li, Hangzhou (CN); Weicai Chen, Hangzhou (CN); Bo Chen, Hangzhou (CN)

(73) Assignee: Alibaba Group Holding Limited (KY)

( * ) Notice: Subject to any disclaimer, the term of this patent is extended or adjusted under 35 U.S.C. 154(b) by 0 days.

This patent is subject to a terminal disclaimer.

(21) Appl. No.: 16/133,506

(22) Filed: Sep. 17, 2018

(65) Prior Publication Data

US 2019/0087090 A1  Mar. 21, 2019

Related U.S. Application Data

(63) Continuation of application No. 14/253,789, filed on Apr. 15, 2014, now Pat. No. 10,114,553.

(30) Foreign Application Priority Data

Apr. 18, 2013 (CN) .......................... 2013 1 0135853

(51) Int. Cl.
  *G06F 12/00* (2006.01)
  *G06F 3/06* (2006.01)
  *G06F 9/455* (2018.01)

(52) U.S. Cl.
  CPC .............. *G06F 3/061* (2013.01); *G06F 3/067* (2013.01); *G06F 3/0659* (2013.01); *G06F 9/45558* (2013.01)

(58) Field of Classification Search
  CPC ........ G06F 3/061; G06F 3/0659; G06F 3/067; G06F 9/45558
  See application file for complete search history.

(56) References Cited

U.S. PATENT DOCUMENTS 6,832,248 B1  12/2004  Byrnes
7,191,207 B2  3/2007  Blount
(Continued)

FOREIGN PATENT DOCUMENTS

| | | |
|---|---|---|
| CN | 101770346 A | 7/2010 |
| CN | 102270104 B | 12/2011 |
| WO | 2010085256 A1 | 7/2010 |

OTHER PUBLICATIONS

Ghemawat et al. "The Google file system." ACM SIGOPS operating systems review. vol. 37. No. 5. ACM, 2003.
(Continued)

*Primary Examiner* — Kalpit Parikh
(74) *Attorney, Agent, or Firm* — Van Pelt, Yi & James LLP

(57) ABSTRACT

Embodiments of the present application relate to a method for scheduling virtual disk input and output (I/O) ports, a device for scheduling virtual disk I/O ports, and a computer program product for scheduling virtual disk I/O ports. A method for scheduling virtual disk I/O ports is provided. The method includes assigning a set of service quality ratings to a corresponding set of virtual disk I/O ports based on a set of reading-writing bandwidth quotas associated with the corresponding set of virtual disk I/O ports in a physical machine, determining a total forecast value of a data bandwidth to be used by reading-writing requests and determining virtual disk I/O ports, allocating reading-writing bandwidth limits to the virtual disk I/O ports, and scheduling virtual disk I/O ports on the physical machine.

19 Claims, 11 Drawing Sheets

(56) References Cited

U.S. PATENT DOCUMENTS

| | | |
|---|---|---|
| 2004/0143664 A1 | 7/2004 | Usa |
| 2012/0233434 A1 | 9/2012 | Starks |
| 2013/0080699 A1 | 3/2013 | Shigeta |
| 2013/0185433 A1 | 7/2013 | Zhu |
| 2013/0198562 A1 | 8/2013 | Anthonisamy |
| 2014/0019667 A1 | 1/2014 | Shimada |

OTHER PUBLICATIONS

Shenoy et al. "Cello: a disk scheduling framework for next generation operating systems." ACM Sigmetrics Performance Evaluation Review. vol. 26. No. 1. ACM, 1998.

Wu et al. "IO QoS: A New Disk I/O Scheduler Module with QoS Guarantee for Cloud Platform." Information Science and Engineering (ISISE), 2012 International Symposium on. IEEE, 2012.

| | WFQ | | | | | |
|---|---|---|---|---|---|---|
| 1 | DATA1 | DATA2 | DATA3 | DATA4 | DATA5 | · · · |
| 2 | DATA1 | DATA2 | DATA3 | DATA4 | DATA5 | · · · |
| 3 | DATA1 | DATA2 | DATA3 | DATA4 | DATA5 | · · · |
| 4 | DATA1 | DATA2 | DATA3 | DATA4 | DATA5 | · · · |
| 5 | DATA1 | DATA2 | DATA3 | DATA4 | DATA5 | · · · |

| 1 | Token1 | Token2 | Token3 | Token4 | Token5 | • • • |
|---|--------|--------|--------|--------|--------|-------|
| 2 | Token1 | Token2 | Token3 | Token4 | Token5 | • • • |
| 3 | Token1 | Token2 | Token3 | Token4 | Token5 | • • • |
| 4 | Token1 | Token2 | Token3 | Token4 | Token5 | • • • |
| 5 | Token1 | Token2 | Token3 | Token4 | Token5 | • • • |

FIG. 5

METHOD AND DEVICE FOR SCHEDULING VIRTUAL DISK INPUT AND OUTPUT PORTS

CROSS REFERENCE TO OTHER APPLICATIONS

This application is a continuation of co-pending U.S. patent application Ser. No. 14/253,789, entitled METHOD AND DEVICE FOR SCHEDULING VIRTUAL DISK INPUT AND OUTPUT PORTS filed Apr. 15, 2014, which claims priority to People's Republic of China Patent Application No. 201310135853.1 entitled A VIRTUAL DISK IO PORT SCHEDULING METHOD AND A SCHEDULING DEVICE THEREFOR, filed Apr. 18, 2013 both of which are incorporated herein by reference for all purposes.

FIELD OF THE INVENTION

The present application relates to a method and device for scheduling virtual disk input and output ports.

BACKGROUND OF THE INVENTION

As "cloud computing" further develops, various cloud platforms have been introduced to satisfy user demand for "cloud services." The cloud platforms utilize virtualization technology to share or monopolize central processing units (CPUs), memory, hard disks, and other hardware resources. As an example, in a cloud platform, a physical machine has virtual machines having different corresponding service ranks. Each virtual machine has a plurality of virtual disks, and each virtual disk has reading and writing input and output (I/O) ports, i.e., virtual disk I/O ports. Typically, the reasons that the virtual machines having the different service ranks are activated on a physical machine are twofold: 1) to satisfy diverse user requirements; and 2) to increase hardware resource utilization of the physical machine. In the cloud platform, actual processing of data reading-writing requests include a fair competition model-based technique of limited I/O reading, writing, and sharing, i.e., a first come first served method. However, in virtual machines with different ranks, a fair competition reading and writing model for limited I/O bandwidth can be somewhat unfair in terms of cost and benefit. For example, a user may pay a higher price to run a service with a higher service rank; however, because processing I/O operations are the same across the virtual machines, the user does not receive the benefits of a higher I/O rate even though the user has paid more. In addition, because applications from different types of business have different I/O bandwidth requirements, cloud platforms should perform I/O scheduling based on real-time I/O bandwidth resource expectations. For example, web-based applications typically expect that high-throughput, low-delay I/O bandwidth service is provided. Yet, some log-recording services often function adequately with low-throughput, high-delay I/O bandwidth service.

A majority of the currently existing cloud platforms share a plurality of virtual machines of I/O reading and writing of a single virtual disk, and the virtual disk is typically located on a physical disk of the physical machine. However, in the cloud platform, the virtual disks used by the virtual machines are not necessarily located on the disks of the physical machine where the virtual machines are located. Instead, the virtual machines can be distributed across an entire cluster of physical machines. Because of the distributed nature of the virtual machines, control over I/O operations of the virtual disk cannot be easily added to a physical disk of the local physical machine or to the operating system core of the local physical machine.

BRIEF DESCRIPTION OF THE DRAWINGS

Various embodiments of the invention are disclosed in the following detailed description and the accompanying drawings.

The drawings described here are intended to further the understanding of the present application, and form a part of this application. The exemplary embodiments of the present application and the descriptions thereof are intended to explain this application, and do not constitute inappropriate limitation of the present application. Among the drawings:

FIG. 2 is a diagram of an embodiment of a weighted queue.

FIG. 5 is a diagram of an embodiment of token container buckets allocated to virtual disk I/O ports.

DETAILED DESCRIPTION

Figure 1:
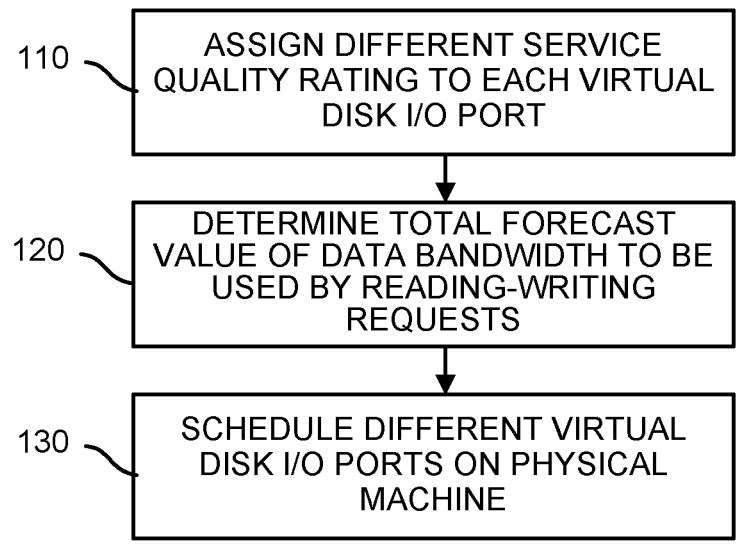
FIG. 1 is a flowchart of an embodiment of a process for scheduling virtual disk I/O ports.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment.

The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Typically, computing equipment comprises one or more processors or central processing units (CPUs), input/output interfaces, network interfaces, and memory.

Memory can include non-permanent memory in a computer-readable medium, random access memory (RAM), and/or non-volatile memory, and other forms, such as read-only memory (ROM) or flash memory (flash RAM). Memory is an example of the computer-readable medium.

Computer-readable media, including permanent, non-permanent, removable, and non-removable media, can store information by any method or technology. Information can include computer-readable commands, data structures, program modules, or other data. Examples of computer storage media include, but are not limited to, phase-change memory (PRAM), static random access memory (SRAM), dynamic random access memory (DRAM), other types of random access memory (RAM), read-only memory (ROM), electrically erasable programmable read-only memory (EEPROM), flash memory or other memory technology, read-only compact disk read-only memory (CD-ROM), digital multi-function optical disks (DVD) or other optical memory, cassette-type magnetic tapes, magnetic tape and magnetic disk storage, or other magnetic storage equipment. Other non-transmitting medium can alternatively be used to store information accessible by computer equipment. As defined in this document, the computer-readable media does not include transitory computer-readable media (transitory media), such as modulated data signals and carrier waves.

A method and device for scheduling virtual disk I/O ports include: assigning a different service quality rating to each virtual disk I/O port based on a reading-writing bandwidth quota for each virtual disk I/O port in a physical machine, allocating appropriate reading-writing bandwidth limits to the virtual disk I/O ports corresponding to all reading-writing requests based on a total forecast value of data bandwidth and service quality ratings corresponding to the virtual disk I/O ports corresponding to all reading-writing requests within a current time segment, and scheduling the different virtual disk I/O ports on the physical machine based on these reading-writing bandwidth limits and the reading-writing bandwidth limits of the virtual disk I/O ports corresponding to the reading-writing requests.

A virtual disk I/O port refers to an I/O port used to access a virtual machine. The virtual disk I/O port corresponds to a virtual port and does not correspond to a physical interface.

A physical device refers to an actual server device including actual hardware components.

A reading-writing request refers to a reading-writing request to a virtual disk I/O port.

A reading-writing bandwidth limit refers to the maximum limit of the total disk I/O bandwidth that can be used by a physical device.

FIG. 1 is a flowchart of an embodiment of a process for scheduling virtual disk I/O ports. In some embodiments, the process 100 is implemented by software in a virtual machine 8100 of a cloud platform 800 of FIG. 8 and comprises:

In 110, a different service quality rating is assigned to each virtual disk I/O port based on a respective reading-writing bandwidth quota for each virtual disk I/O port in a physical machine.

In some embodiments, service quality ratings are used to differentiate between different reading-writing bandwidth quotas for the virtual disk I/O ports. For example, in the event that a supported reading-writing bandwidth is comparatively larger, a higher service quality rating is assigned to the corresponding virtual disk I/O port. In another example where the supported reading-writing bandwidth is comparatively smaller, a lower service quality rating is assigned to the corresponding virtual disk I/O port. In some embodiments, weights are used to express the service quality ratings.

In 120, the cloud platform determines a total forecast value of the data bandwidth to be used by all reading-writing requests within a current time segment and determines the virtual disk I/O ports corresponding to all reading-writing requests, and allocates appropriate reading-writing bandwidth limits to the virtual disk I/O ports corresponding to all reading-writing requests based on the total forecast value of the data bandwidth and the service quality ratings corresponding to the virtual disk I/O ports corresponding to all reading-writing requests. For example, within a 1 ms time segment, the cloud platform first predicts the total data bandwidth to be used by all reading-writing requests for a physical machine, and then determines the reading-writing bandwidth each virtual machine can use based on the conditions of the virtual machines.

In the actual execution process, reading-writing requests that access virtual disk I/O ports are relatively random. In other words, a plurality of virtual disks are distributed in a cloud platform, but within a time segment, not all virtual disk I/O ports have received a reading-writing request. In some embodiments, the length of the time segment is arbitrarily set. Therefore, calculating exactly how many reading-writing requests are to be in the current time segment and how much total bandwidth these reading-writing requests are to use for reading and writing data is difficult. As an aspect, in some embodiments, to enable effective scheduling of the virtual disk I/O ports, a preliminary evaluation is performed on the data bandwidth to be used by all the reading-writing requests within the current time segment to obtain a total forecast value of data bandwidth. Because the total data bandwidth actually used for all reading-writing requests in the previous time segment has a relatively large value as a guide for forecasting the total data bandwidth in the current time segment, the total data bandwidth actually used for all reading-writing requests in the previous time segment can directly serve as the total forecast value of data bandwidth to be used by all reading-writing requests in the current time segment. In some embodiments, the total bandwidth is a dynamically adjusted value. Initially, the value of the total bandwidth is not known. Thus, an initial value is arbitrarily assigned. Subsequently, feedback is used to adjust the value of the total bandwidth until equilibrium is achieved. Please note, in some embodiments, the total bandwidth is a dynamically adjusted value, like traffic. Different conditions result in different total bandwidth values rather than a fixed value. The total forecast value of the data bandwidth is not a single, fixed numerical value, but is to be continually adjusted in different time segments. Concurrently, the virtual disk I/O ports corresponding to the reading-writing requests are not completely the same in different time segments. In some time segments, more reading-writing requests exist, and in some time segments, fewer reading-writing requests exist. Therefore, in the process for scheduling actual virtual disk I/O ports, having the virtual disk I/O ports of the reading-writing requests and their corresponding service quality ratings is sufficient, so long as the virtual disk I/O ports of the reading-writing requests and their corresponding service quality ratings are determined to be within the current time segment.

In operation 120, participation in the allocation of reading-writing bandwidth limits occurs only for those virtual disk I/O ports that received reading-writing requests. For other virtual disk I/O ports that did not receive reading-writing requests, participation in the allocation of reading-writing bandwidth limits does not occur. FIG. 2 is a diagram of an embodiment of a weighted queue. For example, in the event that the service quality ratings are expressed in terms of weights and a weighted queue of N virtual disk I/O ports on a physical machine is WFQ={W1, W2, . . . , Wn}, the form of the weighted queue is shown in FIG. 2. Each row relates to a reading-writing request of a virtual disk I/O port in chronological order. A first row of the weighted queue relates to a first virtual disk I/O port, and a fifth row of the weighted queue relates to a fifth virtual disk I/O port. Within a segment of time, a real-time weighted queue for virtual disks with reading-writing requests is OW={ow1, ow2, . . . , own}. The real-time weighted queue represents a weighted queue for virtual disk I/O ports with reading-writing requests within a segment of time. Thus, the real-time weighted queue is merely a subset of the weighted queue WFQ. This subset of the weighted queue WFQ differs at different times. DATA1, DATA2, etc. refer to the number of bytes for the respective reading-writing requests, the rows represent the reading-writing request sequence, and WFQ represents the reading-writing request order for each virtual machine on a physical machine. In other words, the cloud platform determines the virtual disk I/O ports having reading-writing requests in the current time segment and the service quality ratings corresponding to the virtual disk I/O ports having reading-writing requests based on the real-time weighted queue.

In the event that weights are used to represent service quality ratings of virtual disk I/O ports, as known from the weighted queue (WFQ), the relationship of the total weight (Ws-total or Ws-t) of quota weights of all virtual disk I/O ports to each virtual disk I/O port weight (Wi) Ws-t=ΣWi, and as known from a real-time weighted queue (OW), the relationship of the sum of real-time weights (Wo-t) in the current time segment to the weight OWi of a virtual disk I/O with reading-writing requests is Wo-t=ΣOWi.

In some embodiments, when allocating appropriate reading-writing bandwidth limits to different virtual disk I/O ports based on the total forecast value of the data bandwidth and the different service quality ratings assigned to the virtual disk I/O ports, allocating a total forecast value of the data bandwidth to each virtual disk I/O port is possible in accordance with the ratios of service quality ratings of the virtual disk I/O ports to obtain the reading-writing bandwidth limits allocated to different virtual disk I/O ports. For example, a physical machine has four virtual disks, A, B, C and D. Service quality ratings for four virtual disk I/O ports of the four virtual disks are, respectively, 1, 1, 4 and 4. Only two virtual disk I/O ports, A and C, have reading-writing requests. At the same time, a total forecast value of reading-writing bandwidth of all reading-writing requests in a current time segment, based on the previous time segment, is 100 M. M corresponds to Mbps. In this case, although there are four virtual disk I/O ports, only two virtual disk I/O ports have corresponding reading-writing requests. Therefore, only the two virtual disk I/O ports that have reading-writing requests participate in the allocation of the total forecast value of reading-writing bandwidth to obtain the reading-writing bandwidth limits of the two virtual disk I/O ports, respectively: 100*1/5=20M and 100*4/5=80M.

Figure 3:
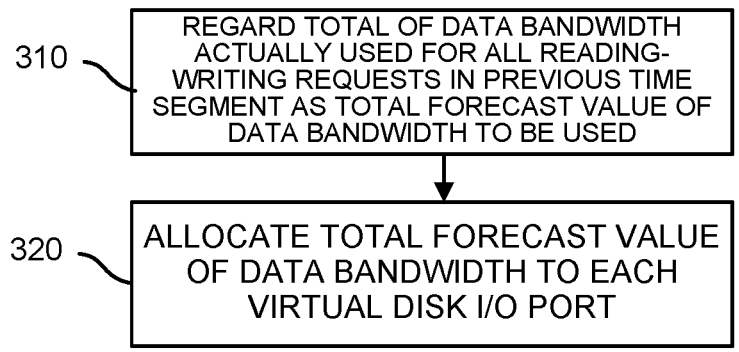
FIG. 3 is a flowchart of an embodiment of a process for allocating reading-writing bandwidth limits to virtual disk I/O ports.

FIG. 3 is a flowchart of an embodiment of a process for allocating reading-writing bandwidth limits to virtual disk I/O ports. In some embodiments, the process 300 is an implementation of 120 of FIG. 1 and comprises:

In 310, the cloud platform regards the total of all data bandwidth actually used for all reading-writing requests in the previous time segment as the total forecast value of data bandwidth to be used by all reading-writing requests in the current time segment.

In 320, the cloud platform allocates the total forecast value of data bandwidth to each virtual disk I/O port based on a proportion of the service quality rating of each virtual disk I/O port of the total bandwidth to allocate appropriate reading-writing bandwidth limits.

In some embodiments, during actual application, in the event that the written-in data and the read-out data for a certain virtual disk I/O port are equal in terms of data volume, individually setting bandwidth values for reading requests and writing requests is not needed. For example, in the event that the reading bandwidth limit and the writing bandwidth limit allocated for a virtual disk I/O port which has a service quality rating of 1 are both 20M, reading bandwidth limit and the writing bandwidth limit allocated to a virtual disk I/O port with a service quality rating of 4 are both 80M. When written-in data is a multiple of read-out data as, for example, where security concerns exist, then, as in operations 320 or 120: when different reading-writing bandwidth limits are allocated to different virtual disk I/O ports, reading bandwidth and writing bandwidth allocations are implemented separately based on reading requests and writing requests, respectively. Reading bandwidth and writing bandwidth allocations are different from reading requests and writing requests because, to ensure the usability of data on the cloud platform, a piece of data is written three times, but a reading of a piece of data can occur from any of the three copies. As an example, when allocations of reading-writing bandwidths are implemented individually based on reading requests and writing requests respectively and a ratio between a volume of data written into a single virtual disk and a volume of data read from a single virtual disk is a multiplicative factor, a ratio between bandwidth allocated for virtual disk I/O port reading operations and bandwidth allocated for writing operations corresponds to the multiplicative factor. For example, in the event that the written-in data is three times the read-out data and the reading bandwidth limit allocated to a virtual disk whose service quality rating is 1 is 20M, then, because the written-in data is 3 times the read-out data, the reading bandwidth limit and the writing bandwidth limit are to be individually set. In addition, the reading bandwidth limit is set to be one-third the writing bandwidth limit. In other words, the reading bandwidth limit is 20M, and the writing bandwidth limit is about 6.6M.

In some embodiments, when the process 100 is first performed, an initial random value serves as the total forecast value of data bandwidths requested by all reading-writing requests within the current time segment. During performance of the process 100 in different time segments, this total preset value for the data bandwidths is continually adjusted causing the difference between this total preset value for data bandwidth and the set value to fall within an effective range. As an example, to adjust the reading requests of the random value based on the total forecast value of data bandwidths to be used, after a certain segment of time ends, the reading bandwidths actually generated by all the reading requests within this segment of time are counted to obtain an actual reading bandwidth statistical result. The actual reading bandwidth statistical result is compared to the random value. In the event that the ratio of the actual reading bandwidth statistical result to the random value is relatively small or close to one, that means that the two values in the ratio are relatively close. Since data needs time to be transmitted across data connections, the reading bandwidth statistical value that is actually counted is typically less than or equal to this random value. This random value might be on the small side compared to the actual bandwidth value. Therefore, in some embodiments, a certain proportion, such as 10% of the reading bandwidth statistical result, is added to each time segment starting from the base of the random value. As discussed above, because the total value is determined by using an arbitrary initial value, the initial value is adjusted based on the difference of the feedback and the initial value. If the difference is greater than a threshold value, the initial value is adjusted until the difference is within an acceptable value. If the ratio is relatively large and is within a certain range, that means that this random value may be on the large side compared to the actual bandwidth value. Therefore, a certain proportion, such as 10% of the reading bandwidth statistical result, is subtracted from each time segment starting from the base of the random value. Through the above process, the initial random value and the bandwidth statistical value within a certain time segment are gradually kept within a reasonable range, and the initial random value bestowed at the start of the process serves as the total forecast value of data bandwidths and is thereby continually revised. The calculation for the revision of the total forecast value of data bandwidths is as follows:

(1) When the set random value is smaller than a first threshold, the size of the random value adjustment will grow larger, as follows:

$R_{i+1}=R_i+S_i/M$, where $R_i$ represents the total forecast value of reading-writing bandwidth corresponding to an i-th time segment and is a random value. $S_i$ relates to a reading-writing bandwidth statistical value to be used by actual reading-writing requests in the i-th time segment. M corresponds to an integer. $R_{i+1}$ relates to a total forecast value of reading-writing bandwidths corresponding to the (i+1)th time segment. Si relating to a statistical bandwidth value means that each time an adjustment occurs, the bandwidth is adjusted based on an actual bandwidth value. The adjustment step size can be different each time and is nonlinear. So if the initial value is relatively small, to get to a reasonable value, the adjustment step size needs to increase. M is a fixed value, set to 10 empirically.

(2) When the set random value is larger than a second threshold, the size of the adjustment steps will grow smaller, as follows:

$R_{i+1}=R_i-S_i/M$, where $R_i$ represents the total forecast value of reading-writing bandwidth corresponding to an i-th time segment and is a random value. $S_i$ relates to a reading-writing bandwidth statistical value to be used by actual reading-writing requests in the i-th time segment. M corresponds to an integer. $R_{i+1}$ relates to a total forecast value of reading-writing bandwidths corresponding to the (i+1)th time segment.

In 130, the cloud platform schedules different virtual disk I/O ports on the physical machine based on the actual bandwidth to be used by each reading-writing request within the current time segment and the reading-writing bandwidth limit for the virtual disk I/O ports corresponding to the reading-writing requests.

In some embodiments, to control the reading-writing bandwidth, a token container-based token algorithm is employed. A quantity of token containers corresponding to a virtual disk I/O port in the current time segment is controlled, and the actual bandwidth to be used by each reading-writing request in the current time segment is compared to the real-time total capacity of all token containers corresponding to its virtual disk I/O port. Virtual disk I/O port reading and writing is carried out based on the comparison results and thus virtual disk I/O port scheduling is obtained.

Figure 4:
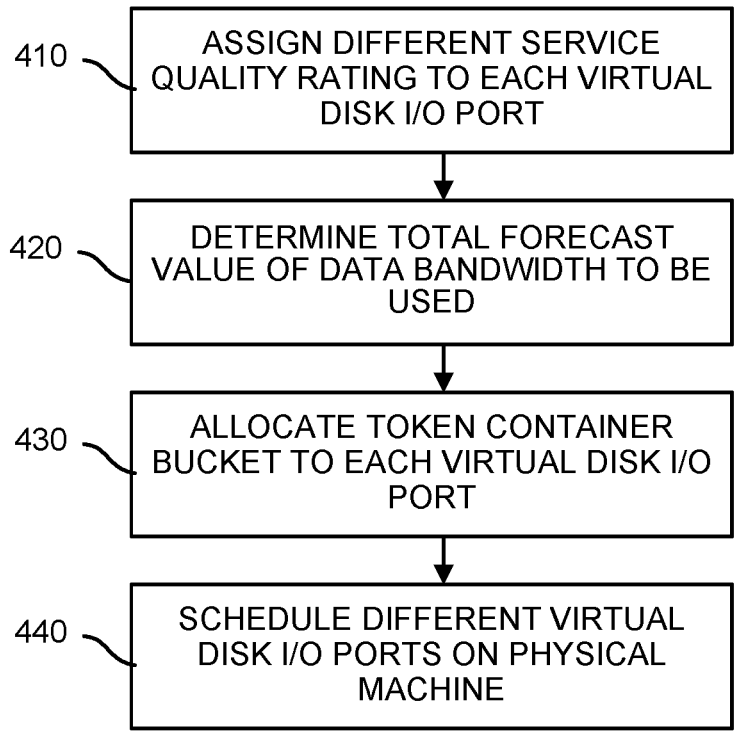
FIG. 4 is a flowchart of another embodiment of a process for scheduling virtual disk I/O ports.

FIG. 4 is a flowchart of another embodiment of a process for scheduling virtual disk I/O ports. In some embodiments, the process 400 is implemented by a cloud platform 800 of FIG. 8 and comprises:

In 410, the cloud platform assigns a different service quality rating to each virtual disk I/O port based on a reading-writing bandwidth quota for each virtual disk I/O port in the physical machine.

In some embodiments, operation 110 of FIG. 1 corresponds to operation 410. For example, both operations use weights to express the service quality ratings of the different virtual disk I/O ports.

In 420, the cloud platform determines a total forecast value of the data bandwidth to be used by all reading-writing requests within a current time segment and the virtual disk I/O ports corresponding to all reading-writing requests, and allocates appropriate reading-writing bandwidth limits to the virtual disk I/O ports corresponding to all reading-writing requests based on the total forecast value of the data bandwidth and the service quality ratings corresponding to the virtual disk I/O ports corresponding to all reading-writing requests.

Please note that operation 420 may be similar to operation 120 of FIG. 1. For example, the reading-writing bandwidth limit allocations are implemented based on the total of all data bandwidths actually used by all reading-writing requests within the previous time segment serving as the total forecast value of data bandwidths required by all reading-writing requests within the current time segment.

In 430, the cloud platform allocates a token container bucket to each virtual disk I/O port. In some embodiments, each token container bucket includes a plurality of token containers, and the capacity of each token container corresponds to the size of the reading-writing bandwidth limit allocated to the virtual disk I/O port used to control scheduling of the different virtual I/O ports.

FIG. 5 is a diagram of an embodiment of token container buckets allocated to virtual disk I/O ports. A first row relates to a token container bucket (basebucket) allocated to a first virtual disk I/O port. The fifth row relates to a token container bucket (basebucket) allocated to a fifth virtual disk I/O port. For example, each token container bucket (basebucket) has ten token containers (token-buckets), and each token corresponds to a token container.

As described above, the virtual disk I/O ports can be effectively scheduled based on a token algorithm. One token container bucket (basebucket) is allocated to each virtual disk I/O port, and the token container bucket (basebucket) accommodates a certain number of token containers. Token container buckets corresponding to different virtual disk I/O ports include the same number of token containers. For example, a token container bucket corresponding to a virtual disk I/O port whose service quality rating is 1 is defined as being able to accommodate a maximum of ten token containers. Similarly, a token container bucket corresponding to a virtual disk I/O port whose service quality rating is 4 is defined as being able to accommodate a maximum of ten token containers. In other words, in some embodiments, the quantities of token containers included in the token container buckets allocated to the various virtual disk I/O ports are equal. Please note that, after a certain number of reading-writing requests have been processed, the quantities of actual remaining token containers in each token container bucket might not be the same. The reason that the quantities of actual remaining token containers in each token container bucket may not be the same is that, in the virtual disk I/O port scheduling process, the distribution of token containers to be controlled is based on the bandwidths of actual reading-writing requests. Different reading-writing requests are to utilize different bandwidths. Therefore, the specific distributed quantities of token containers are not entirely the same for the different virtual disk I/O ports. As an aspect, the capacities of token containers in different token container buckets are different. The capacities actually correspond to the reading-writing bandwidth limits allocated to the corresponding virtual disk I/O ports. For example, if the ratio of reading data to writing data is 1:1 and the reading-writing bandwidth limit allocated to a virtual disk I/O port with a service quality rating of 1 is 20M, the capacity of the token containers in the corresponding token container bucket is to be 20M. Similarly, in a token container bucket whose reading-writing bandwidth limit is 80M, the token container capacity is to be 80M. In another example, if the ratio of reading data and writing data is 1:3, the reading bandwidths and the writing bandwidths are to be controlled independently. If the reading bandwidth limit allocated to a virtual disk I/O port with a service quality rating of 1 is 20M, when controls are imposed independently, the capacity of token containers in the token container bucket of the corresponding reading requests is to be 20M. The writing bandwidth limit is about 6.6 M, and the capacity of the token containers in the corresponding token container bucket will be 6.6 M. Please note that in cloud storage, to ensure high usability of data, when data is written to the cloud storage, the data is triplicated (written three times). For example, 1 MB of data written corresponds to 3 MB of data on a physical drive. When reading any of the three written copies, if the user wants to read the 1 MB of data that was just written, only 1 MB of data is read. The I/O capabilities for reading and writing do not differ greatly. So, if a user spends 3 s to write 1 MB of data, only 1 s is spent to read the 1 MB of data, which means the writing speed is about one third of the reading speed. In a token container bucket whose reading-writing bandwidth limit is 80 M, the token container capacity of the corresponding reading bandwidth is 80M, while the token contain capacity of the corresponding writing bandwidth is about 26.6M. In other words, when a token container bucket is allocated to each virtual disk I/O port, the size of the token containers contained in the token container bucket of each virtual disk I/O port positively relates to the service quality ratings of the corresponding virtual disk I/O ports.

In some embodiments, during scheduling of the different virtual disk I/O ports, the distribution of token containers in the token container bucket allocated for each virtual disk I/O port is adjusted in real-time based on the reading-writing requests in the different time segments. As an example, when real-time adjustments are made to the distribution of the token containers in the token container bucket allocated for each virtual disk I/O port, the real-time capacity of the token container buckets corresponding to the virtual disk I/O ports is no greater than the quota capacity of the corresponding token container buckets. Please note that the quota capacity of the token containers can refer to a maximum number of containers that can be accommodated by a token container bucket. This quota capacity of the token containers can be obtained from a statistical result of several tests.

For example, in a time segment, for a virtual disk I/O port with a service quality rating of 1, the corresponding token container bucket only accommodates three token containers. The capacity of each token container is 20M. Therefore, in the current time segment, the maximum bandwidth for reading and writing data that can be permitted for this virtual disk I/O port is 60M. Therefore, if the bandwidth to be used by actual reading-writing requests in the current time segment is greater than 60M—is, for example, 75M, an option is to wait for the next time segment, in which at least another 20M token container is again to be distributed to this token container bucket. And thus the reading and writing of these actual reading-writing requests can be achieved.

In some embodiments, when the distribution of token containers is being controlled, the control is imposed based on a number of token containers actually accommodated in the corresponding token container bucket in the current time segment Rn and the number of token containers to be used by the bandwidth of the actual reading-writing requests Nn. If the total capacity of the Rn token containers actually accommodated in the corresponding token container bucket in the current time segment is a positive number, then this means that the quantity of token containers in the token container bucket in the current time segment is sufficient to achieve the corresponding reading-writing requests. Rn represents a total capacity of the token containers in the corresponding token container bucket, and Nn represents the number of bytes for the reading-writing requests. The algorithm for permitting a reading-writing request to proceed is the following: when Rn is a positive value, regardless of Nn's value, the reading-writing request is allowed to proceed, and Nn is subtracted from Rn. If Nn>Rn, then the subsequent reading-writing request cannot proceed until Rn becomes positive again. In other words, distributing the token containers into the token container bucket is possible. At the most, the quantity of token containers to be distributed into the token container bucket is the quota. For example, the token container quota in the token container bucket is ten. In other words, the token containers are distributed until, at the most, the quantity of distributed token containers reaches ten. In other words, while the token container quantity quota in the token container bucket has not been exceeded, the token containers can be distributed according to the bandwidth to be used for the reading-writing requests.

Referring back to FIG. 4, in 440, the cloud platform schedules different virtual disk I/O ports on the physical machine based on the actual bandwidth to be used by each reading-writing request within the current time segment and the reading-writing bandwidth limits for the virtual disk I/O ports corresponding to each reading-writing request.

For example, in the current time segment, the token container bucket corresponding to a virtual disk I/O port has four token containers, and the capacity of each token container is set to 20M. Therefore, the actual current capacity of this token container bucket is 4*20=80M, a positive number. If the reading-writing requests are less than 80M, the reading-writing requests can be performed in the current time segment. Otherwise, performance of the reading-writing requests is to be delayed until, within a certain number of time segments, the distribution of sufficient token containers where the real-time capacity of the token container bucket reaches the bandwidth value to be used by the actual reading-writing requests.

Figure 6:
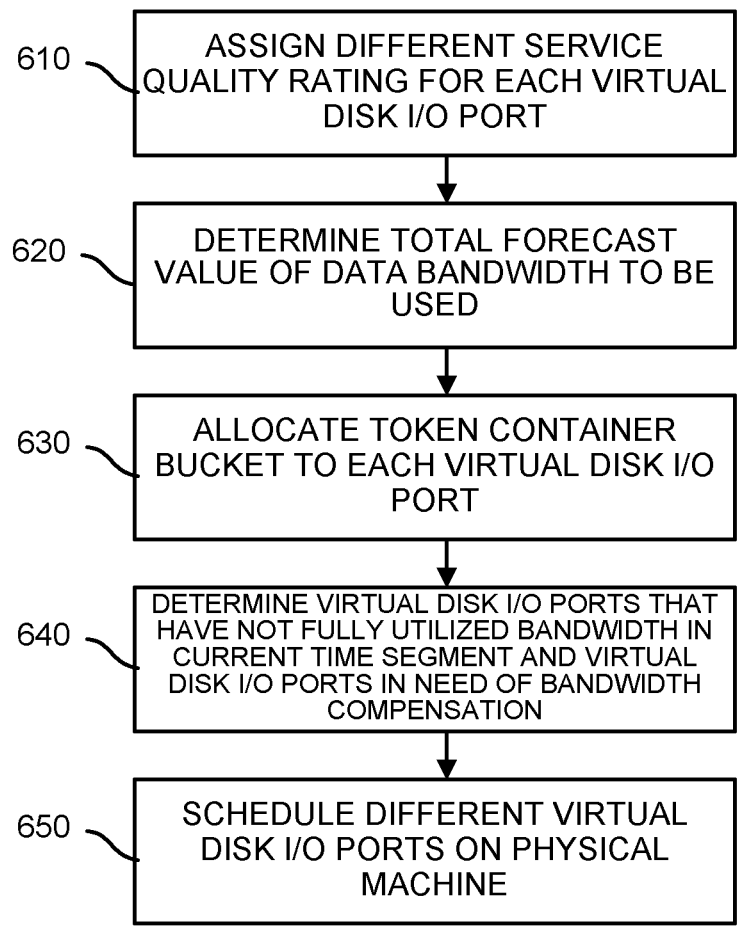
FIG. 6 is a flowchart of yet another embodiment of a process for scheduling virtual disk I/O ports.

FIG. 6 is a flowchart of yet another embodiment of a process for scheduling virtual disk I/O ports. The process 600 differs from the above processes in the following: in some embodiments, which build on the foundation of the above processes, after several time segments, the process 600 learns through analysis of statistics that the bandwidth of certain virtual disk I/O ports have not been fully used. In other words, some bandwidth is unused. At the same time, the bandwidth of certain virtual disk I/O ports is insufficient to satisfy the corresponding reading-writing requests. Therefore, in some embodiments, the bandwidth of virtual disk I/O ports that are not fully used are allocated to virtual disk I/O ports that require additional bandwidth. In other words, during a time segment, some virtual disk I/O ports of a virtual machine may not have any reading-writing requests, so the token containers allocated to these virtual disk I/O ports are unused. Thus, these unused token containers are gathered up and redistributed to virtual disk I/O ports that could use the token containers to ensure a higher utilization rate of the total bandwidth. The actual control can be affected through token container compensation. In some embodiments, the process 600 is implemented by a cloud platform 800 of FIG. 8 and comprises:

In 610, the cloud platform assigns a different service quality rating for each virtual disk I/O port based on a reading-writing bandwidth quota for each virtual disk I/O port of the physical machine. Please note that the bandwidths of virtual disk I/O ports are shared, but the reading-writing requests are controlled separately.

In 620, the cloud platform determines a total forecast value of data bandwidth to be used by all reading-writing requests within a current time segment and the virtual disk I/O ports corresponding to all reading-writing requests, and allocates appropriate reading-writing bandwidth limits to the virtual disk I/O ports corresponding to all reading-writing requests based on the total forecast value of the data bandwidth and the service quality ratings corresponding to the virtual disk I/O ports corresponding to all reading-writing requests.

In 630, the cloud platform allocates a token container bucket to each virtual disk I/O port. In some embodiments, each token container bucket includes a plurality of token containers, and the capacity of each token container corresponds to the size of the reading-writing bandwidth limit allocated to the virtual disk I/O port used to control scheduling of the different virtual disk I/O ports.

In 640, the cloud platform determines virtual disk I/O ports that have not fully utilized bandwidth in the current time segment and virtual disk I/O ports in need of bandwidth compensation, and distributes surplus token containers in the token container buckets corresponding to the non-fully utilized virtual disk I/O ports to the virtual disk I/O ports in need of bandwidth to implement token container compensation between the different token container buckets of different virtual disk I/O ports.

In 650, the cloud platform schedules different virtual disk I/O ports on the physical machine based on the actual bandwidth to be used by each reading-writing request within the current time segment and the reading-writing bandwidth limit for the virtual disk I/O port corresponding to each reading-writing request.

After several executions of operations 610 to 640, with statistics on the actual reading-writing bandwidth being collected after each execution, a surplus of token containers in the token container buckets of certain virtual disk I/O ports and the token containers in token container buckets in certain virtual disk I/O ports that are unable to satisfy their reading-writing bandwidth are known to exist. At this point, the surplus token containers are used to compensate those token container buckets in need of token containers. In some embodiments, the compensation is implemented based on the service quality ratings of the virtual disk I/O ports. For example, if the token container bucket of a virtual disk I/O port has a surplus of 20M token containers, and if the other two virtual disk /IO port container buckets, which have service quality ratings of 2 and 4, have a deficiency of token containers, the virtual disk I/O port whose service quality rating is 2 receives one-third of 20M (or about 6.7M) as compensation, and the virtual disk I/O port whose service quality rating is 4 receives two-thirds of 20M (or about 13.3M) as compensation.

Likewise, in some embodiments, during token container compensation, the capacity of token containers available for compensation, i.e., the extra token container capacity, is totaled. Then, the virtual disk I/O ports on the physical machine that have a deficiency of bandwidth and the corresponding service quality ratings are counted. The total token containers to be compensated are allocated based on their service quality rating ratios to the virtual disk I/O ports to be compensated. Please note that as a result of the compensation, in some situations, the compensated token container buckets might exceed their quotas. Thus, in subsequent time segments, these token container buckets cannot receive distributions or compensation of token containers until the actual number of token containers in the token container bucket is less than the quota.

Building on the foundation of the above embodiments of the process: when virtual disk I/O port quantities on a physical machine change and different reading-writing bandwidth limits are allocated to different virtual disk I/O ports, reading-writing bandwidth limits can be re-allocated to the virtual disk I/O ports after the change in quantity occurs.

An example is provided below. Two virtual disk I/O ports on one physical machine to process reading-writing requests without token container compensation are used and the reading and writing data ratio is 1:1. In this example, the service quality ratings of the two virtual disk I/O ports are 1 and 4, and the total forecast value of data bandwidth of all reading requests and writing requests in the current segment of time is 100M. Thus, in accordance with the service quality ratio, the virtual disk I/O port with a service quality rating of 1 is allocated one-fifth of 100M, i.e., 20M, and the virtual disk I/O port with a service quality rating of 4 is allocated four-fifths of 100M, i.e., 80M. These allocated amounts correspond to the reading bandwidth limits for the respective virtual disk I/O ports. Since the reading and writing data ratio is 1:1, the writing bandwidth limits for these two virtual disk I/O ports are similarly 20M and 80M. Based on the above allocations, assume that both the reading token container buckets corresponding to two virtual disk I/O ports have ten reading token containers and that the capacities of the reading token containers are 20M and 80M, respectively. In the current time segment, one reading request is acquired from a reading-writing request queue. A data reading operation is performed on the virtual disk I/O port whose service quality rating is 1. The data bandwidth required by this reading request is 30M. In the current time segment, the token container bucket of the virtual disk I/O port whose service quality rating is 1 has a total of ten reading token containers, each reading token container has a capacity of 20M. The total supportable bandwidth is 10*20=200M, a positive number, which can satisfy the 30M reading request. If another reading request or writing request is acquired from the reading-writing request queue for a data reading or writing operation to be performed on the virtual disk I/O port whose service quality rating is 1, the data bandwidth required by this reading or writing request is 190M. Because the performing of the previous reading-writing request whose required data bandwidth was 30M, only 200−30=170M of data bandwidth remains for the corresponding virtual disk. The total capacity of all token containers in the token container bucket of the corresponding virtual disk I/O port is a positive number. Therefore, because the data bandwidth to be used by the other reading or writing request is 190M, the other reading or writing request can be performed. However, after the performed request whose data bandwidth is 190M, the capacity of the remaining token containers in the corresponding virtual disk I/O port is 170−190=−20M. The required data bandwidth has become a negative number. Therefore, other reading-writing requests in the current segment are temporarily not performed. Re-distribution of token containers into the corresponding token container bucket in the next time segment to cause the total capacity of token containers in the corresponding token container bucket to become positive is to be waited for. Only after waiting can performance of the other reading or writing request be completed. Please note that, if the token containers in the token container bucket have nearly reached a maximum (if, for example, the token container bucket can accommodate a maximum of 10 reading token containers), the token containers to be distributed to the token container bucket are to be automatically discarded. As an aspect, the token containers to be discarded can be given as compensation to other token container buckets deficient of token containers.

An example is provided below: two virtual disk I/O ports on one physical machine processing reading-writing requests without using token container compensation are used, and the reading-writing data ratio is 1:3. The service quality ratings of the two virtual disk I/Os are 1 and 4, and the total forecast value of data bandwidth of all reading requests and writing requests in the current time segment is 100 M. Thus, in accordance with the service quality rating ratio, the virtual disk I/O port with a service quality rating of 1 is allocated one-fifth of 100M, i.e., 20M, and the virtual disk I/O port with a service quality rating of 4 is allocated four-fifths of 100M, i.e., 80M. These allocation amounts correspond to the reading bandwidth limits for the respective virtual disk I/O ports. Based on the allocation amounts, assume that both the reading token container buckets corresponding to the two virtual disk I/O ports are set as having 10 reading token containers and that the capacities of the reading token containers are 20M and 80M, respectively. Since the reading and writing data ratio is 1:3, the writing bandwidth limits for these two virtual disk I/O ports are similarly 6.6M and 26.4M. Assume that both reading token container buckets corresponding to the two virtual disk I/O ports have 10 writing token containers and that the capacities of the writing token containers are 6.6M and 26.4M, respectively. In the current time segment, one reading request is acquired from the reading-writing request queue. A data reading operation is performed on the virtual disk I/O port having a service quality rating of 1. The data bandwidth to be used by this reading request is 30M. In the current time segment, the token bucket of the virtual disk I/O port whose service quality rating is 1 has a total of 10 reading token containers, each reading token container having a capacity of 20M. The supportable bandwidth is 10*20=200M, a positive number, which can satisfy the 30M reading request. Therefore, this reading request is performed, and bandwidth equivalent to the capacity of 1.5 token containers is removed from the token container bucket. If another writing request is acquired from the reading-writing request queue, and a data reading or data writing operation is performed on the virtual disk I/O port whose service quality rating is 1, the data bandwidth required by this writing request is to be 60M. Because the corresponding virtual disk I/O port writing token container bucket has 6.6*10=66M of data bandwidth, a positive number, writing requests of any bandwidth, e.g., 80M, can be executed in the current time segment. However, because the previous writing request was performed, the total capacity of token containers in the corresponding writing token container bucket becomes 66 M−80M=−14M, which is a negative number. The performance of the other writing request is not satisfied. Therefore, distribution of writing token containers in the next time segment is to be delayed to cause the total capacity of token containers in the writing token container bucket to become positive. Also, please note that if the token containers in the token container bucket have nearly reached a maximum (if, for example, the token container bucket accommodates a maximum of ten reading token containers), token containers to be distributed to this token container bucket are to be automatically discarded. In some embodiments, the discarded token containers are used to compensate other token container buckets deficient of token containers.

Please note the following relates to the embodiments described above: when virtual disk I/O port quantities on a physical machine change and different reading-writing bandwidth limits are allocated to different virtual disk I/O ports, reading-writing bandwidth limits can be re-allocated to the virtual disk I/O ports following the change in quantity.

Figure 7:
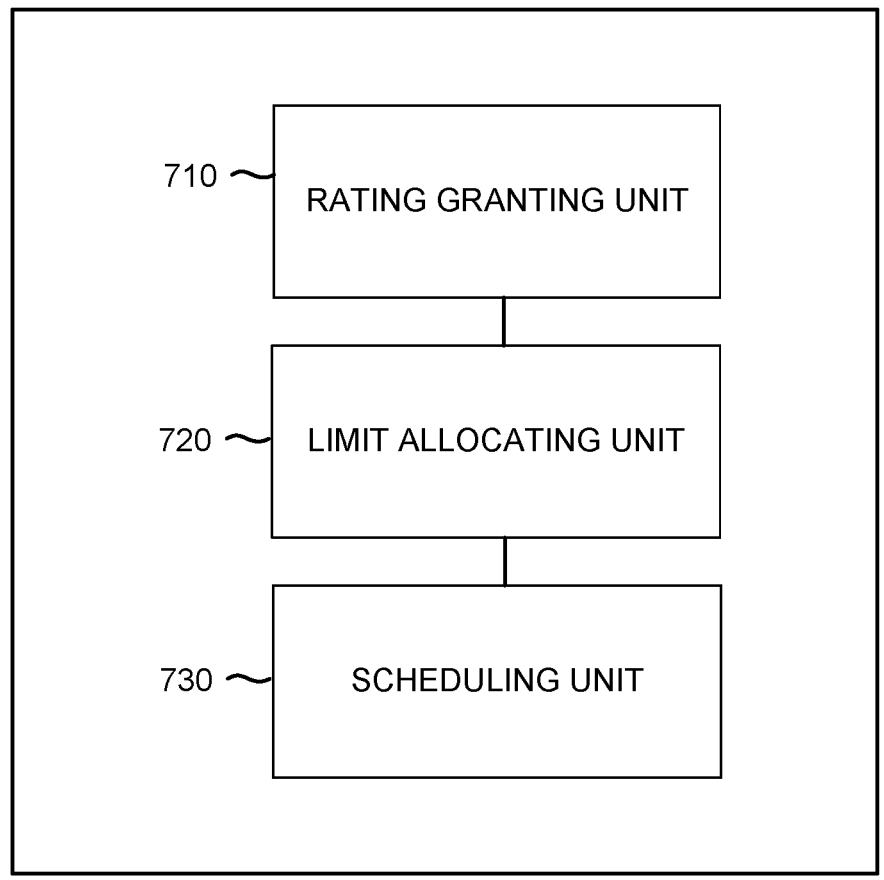
FIG. 7 is a structural diagram of an embodiment of a device for scheduling virtual disk I/O ports.

FIG. 7 is a structural diagram of an embodiment of a device for scheduling virtual disk I/O ports. In some embodiments, the device 700 is an implementation of a cloud platform 800 of FIG. 8 and includes a rating granting unit 710, a limit allocating unit 720, and a scheduling unit 730.

The rating granting unit 710 assigns a different service quality rating to each virtual disk I/O port based on a reading-writing bandwidth quota for each virtual disk I/O port in a physical machine.

The limit allocating unit 720 determines a total forecast value of data bandwidth to be used by all reading-writing requests within a current time segment and the virtual disk I/O ports corresponding to all reading-writing requests, and allocates appropriate reading-writing bandwidth limits to the virtual disk I/O ports corresponding to all reading-writing requests based on the total forecast value of the data bandwidth and service quality ratings corresponding to the virtual disk I/O ports corresponding to all reading-writing requests.

The scheduling unit 730 schedules different virtual disk I/O ports on the physical machine based on the actual bandwidth to be used by each reading-writing request within the current time segment and the reading-writing bandwidth limit for the virtual disk I/O ports corresponding to each reading-writing request.

In another embodiment, the limit allocating unit 720 further independently allocates reading bandwidth limits and writing bandwidth limits based on reading requests in comparison to writing requests. The reason for performing independent allocations is that the written-in data and the read-out data are not equal when the writing and reading requests are performed. An additional explanation is provided in the above corresponding processes. In some embodiments, when the volume of data written into a virtual disk and the volume of data read from an individual virtual disk constitutes a ratio, the reading bandwidth limit and the writing bandwidth allocated by the limit allocating unit 720 to the corresponding I/O ports constitute a corresponding ratio.

In some embodiments, to schedule virtual disk I/O ports, the limit allocating unit 720 allocates a token container bucket to each virtual disk I/O port, and each token container bucket includes a plurality of token containers. The capacity of each token container corresponds to the size of the reading-writing bandwidth limit allocated to the virtual disk I/O port used to control scheduling of the different virtual I/O ports. As an example, in the scheduling process, the limit allocating unit 720 makes real-time adjustments corresponding with the reading-writing requests in different time segments to a distribution of token containers in the token container bucket corresponding to each virtual disk I/O port. Such a situation addresses the number of token containers in a token container bucket corresponding to a number of virtual disk I/O ports still less than the token container bucket quota.

In some embodiments, the limit allocating unit 720, when scheduling different virtual disk I/O ports on the physical machine, provides token container compensation between different token container buckets of different virtual disk I/O ports. Such a situation can address the following: in some cases, the token container buckets corresponding to certain virtual disk I/O ports in a physical machine have attained their quotas and cannot satisfy the bandwidth used in actual reading-writing requests. At the same time, token container buckets corresponding to other virtual disk I/O ports whose token containers have not been used up exist. In other words, the token container buckets corresponding to the other virtual disk I/O ports are very likely in a non-quota state. Therefore, compensation is implemented between the surplus token containers and the token container buckets corresponding to virtual disk I/O ports to be compensated.

In some embodiments, when a change in the quantity of virtual disk I/O ports occurs in the physical machine and corresponding reading-writing bandwidth limits are allocated to different virtual disk I/O ports, the limit allocating unit 720 re-allocates reading-writing bandwidth limits of the virtual disk I/O ports after the change in quantity occurs.

In some embodiments, the time segments are continually adjusted in accordance with real-time responses until the time segments approximate the time segments to be used by the real-time responses.

Figure 8:
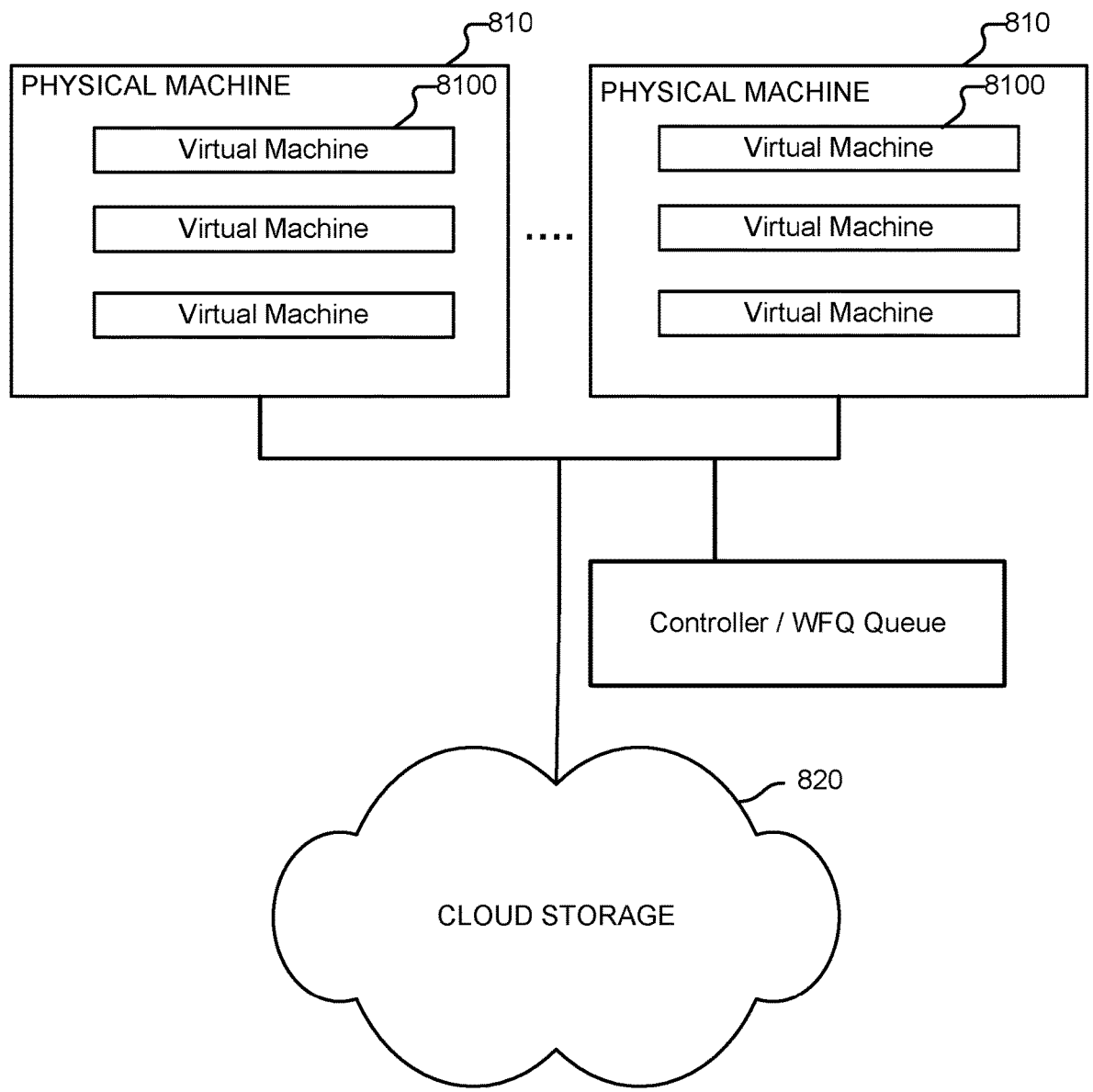
FIG. 8 is a structural diagram of an embodiment of a cloud platform deployment.

FIG. 8 is a structural diagram of an embodiment of a cloud platform deployment. In some embodiments, the cloud platform deployment 800 implements the above processes and comprises multiple physical machines 810 combined to form a cloud storage 820. Each physical machine 810 may correspond to a plurality of distributed virtual machines 8100. Each virtual machine 8100 corresponds to a plurality of virtual disks (not shown). These virtual disks correspond to WFQ queues. Each virtual disk has a corresponding virtual disk I/O port. In some embodiments, scheduling of the virtual disk I/O ports on each physical machine 810 is based on one of the above processes.

For example, supposing that a physical machine has four virtual machines: VM1, VM2, VM3 and VM4. Each virtual machine has one virtual disk I/O port. The weights of the four virtual machines are 1, 1, 4 and 4, respectively.

Figure 9:
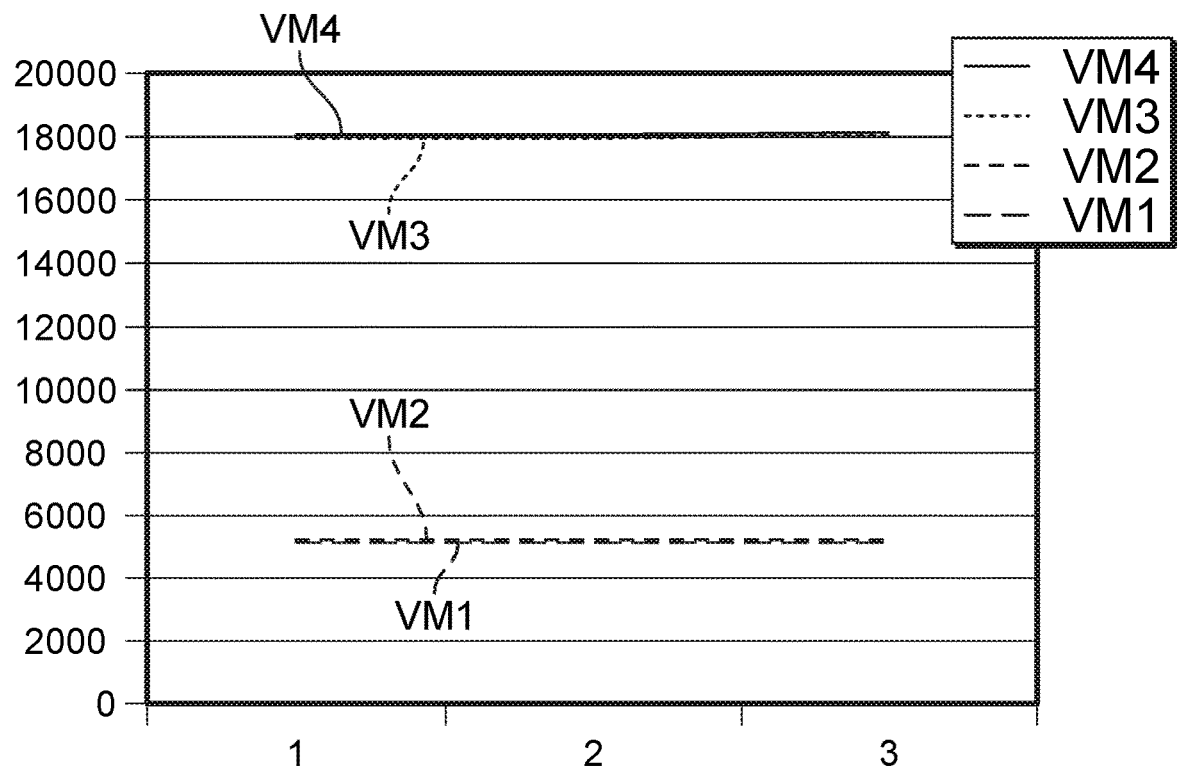
FIG. 9 is a diagram of an example of bandwidth sampling statistics when processing writing requests.
Figure 10:
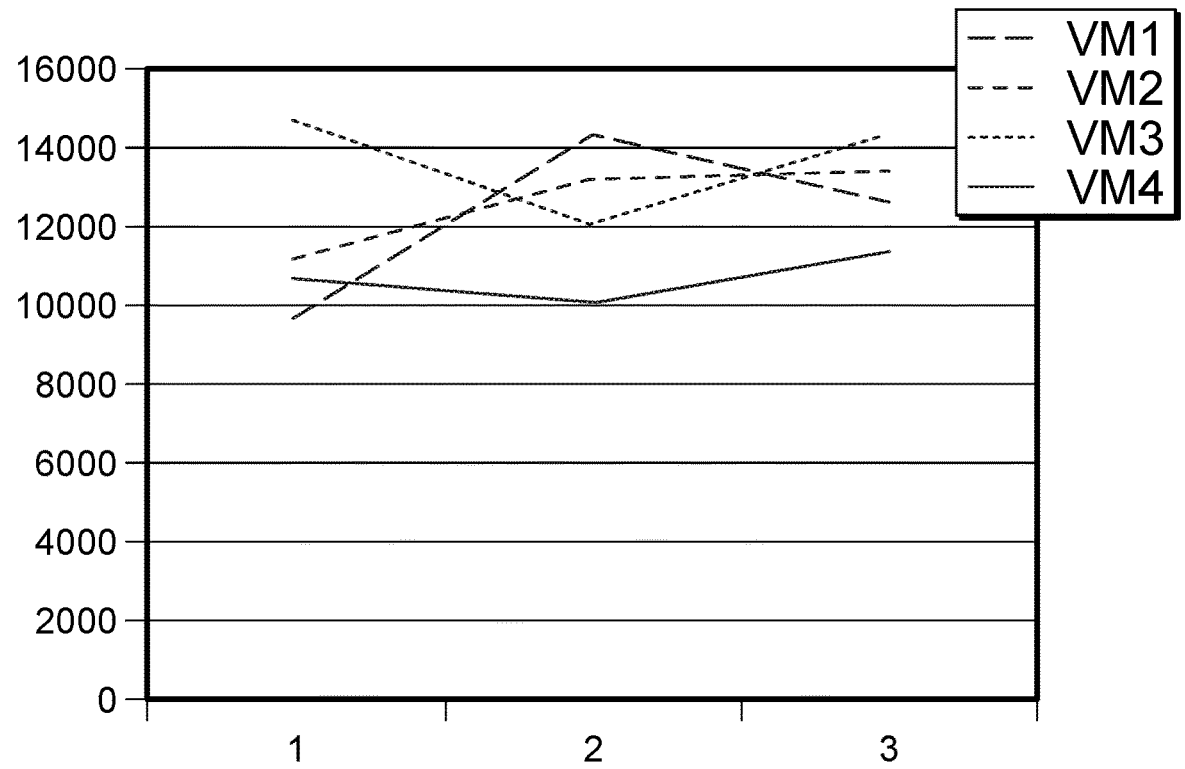
FIG. 10 is a diagram of bandwidth sampling statistics when conventionally processing writing requests.

FIG. 9 is a diagram of an example of bandwidth sampling statistics when processing writing requests using techniques described in this application. During the writing operations of the corresponding virtual disk I/O ports of the virtual machines VM1, VM2, VM3 and VM4, the corresponding statistical line fluctuations are relatively flat and the processing of the writing requests becomes rather stable. FIG. 10 is a diagram of bandwidth sampling statistics when conventionally processing writing requests. During the writing operations of the corresponding virtual disk I/O ports of the virtual machines VM1, VM2, VM3 and VM4, the corresponding statistical line fluctuations are relatively large, and the processing of the writing requests is unstable.

Figure 11:
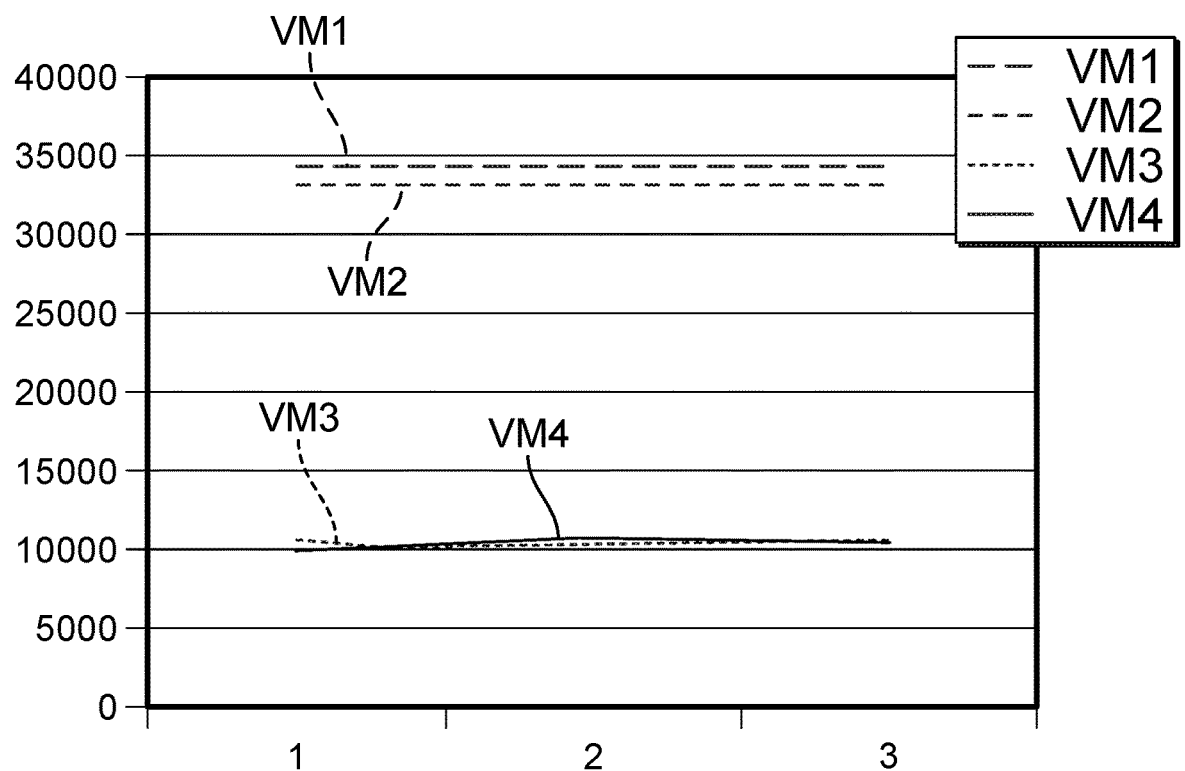
FIG. 11 is a diagram of an example of bandwidth sampling statistics when processing reading requests.
Figure 12:
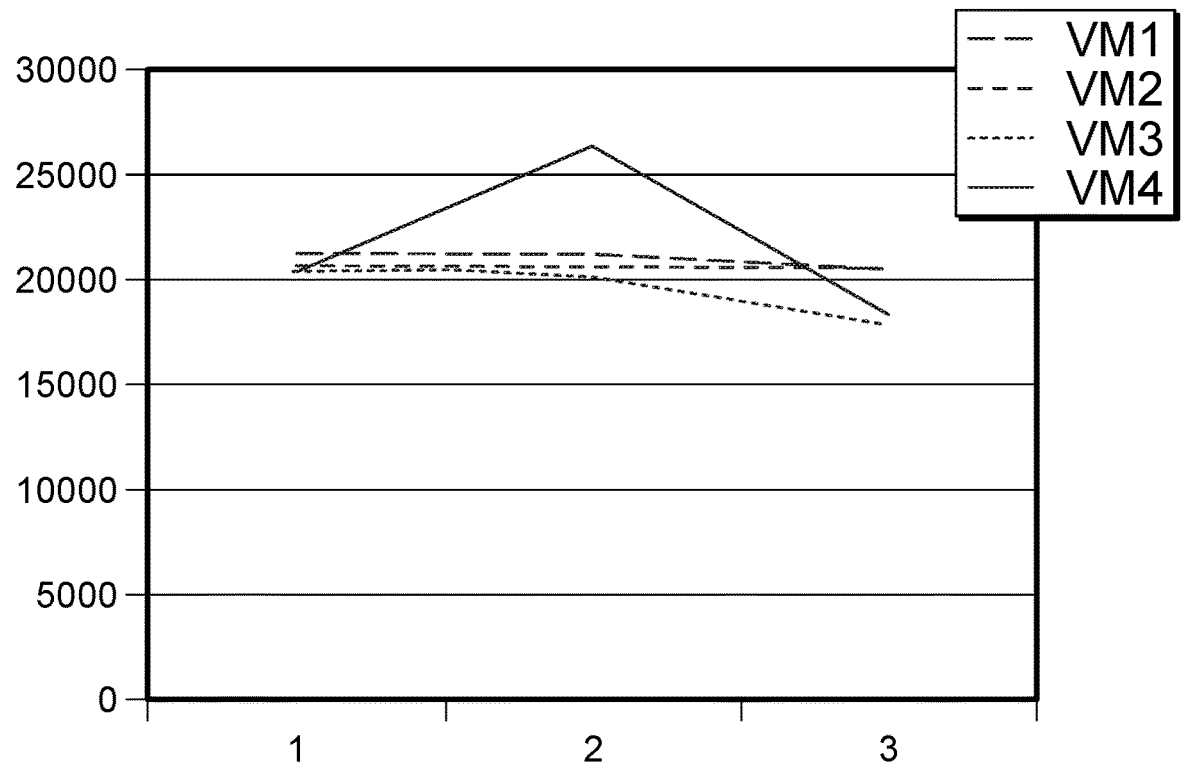
FIG. 12 is a diagram of bandwidth sampling statistics when conventionally processing reading requests.

FIG. 11 is a diagram of an example of bandwidth sampling statistics when processing reading requests using techniques described in this application. During the processing of reading requests of the corresponding virtual disk I/O ports of the virtual machines VM1, VM2, VM3 and VM4, the corresponding statistical line fluctuations are not large, and the processing of reading requests becomes stable. FIG. 12 is a diagram of bandwidth sampling statistics when conventionally processing reading requests. During the processing of reading requests of the corresponding virtual disk I/O ports of the virtual machines VM1, VM2, VM3 and VM4, the corresponding statistical line fluctuations are relatively large, and the processing of reading requests is unstable.

In above FIGS. 9-12, the horizontal coordinates represent sampling times, and the vertical coordinates represent bandwidth size actually occurring at virtual disk I/O ports corresponding to the sampling times.

Figure 13:
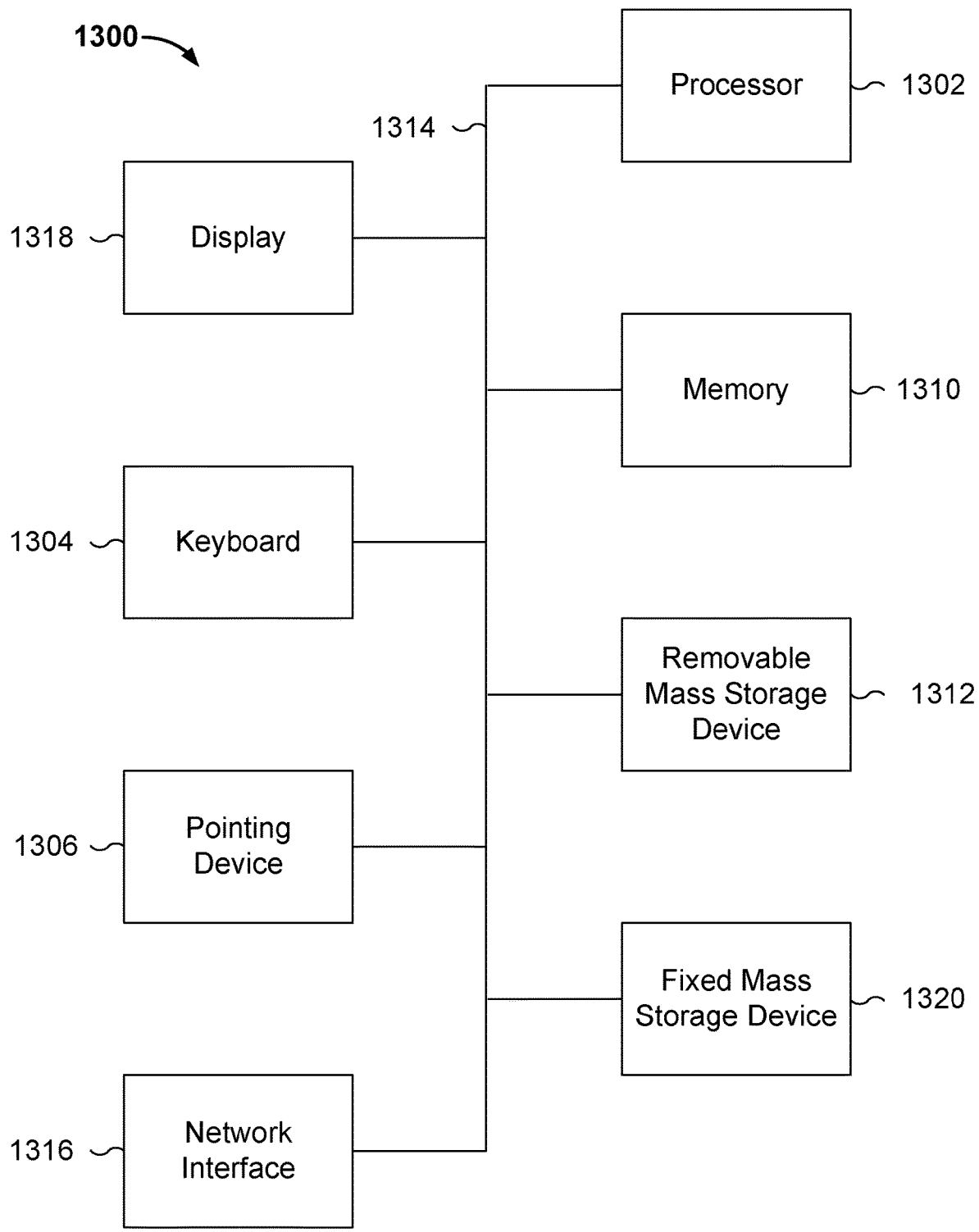
FIG. 13 is a functional diagram of an embodiment of a computer system for scheduling virtual disk I/O ports.

FIG. 13 is a functional diagram of an embodiment of a computer system for scheduling virtual disk I/O ports. As will be apparent, other computer system architectures and configurations can be used to schedule virtual disk I/O ports. Computer system 1300, which includes various subsystems as described below, includes at least one microprocessor subsystem (also referred to as a processor or a central processing unit (CPU)) 1302. For example, processor 1302 can be implemented by a single-chip processor or by multiple processors. In some embodiments, processor 1302 is a general purpose digital processor that controls the operation of the computer system 1300. Using instructions retrieved from memory 1310, the processor 1302 controls the reception and manipulation of input data, and the output and display of data on output devices (e.g., display 1318).

Processor 1302 is coupled bi-directionally with memory 1310, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 1302. Also as is well known in the art, primary storage typically includes basic operating instructions, program code, data and objects used by the processor 1302 to perform its functions (e.g., programmed instructions). For example, memory 1310 can include any suitable computer-readable storage media, described below, depending on whether, for example, data access needs to be bi-directional or unidirectional. For example, processor 1302 can also directly and very rapidly retrieve and store frequently needed data in a cache memory (not shown).

A removable mass storage device 1312 provides additional data storage capacity for the computer system 1300, and is coupled either bi-directionally (read/write) or uni-directionally (read only) to processor 1302. For example, storage 1312 can also include computer-readable media such as magnetic tape, flash memory, PC-CARDS, portable mass storage devices, holographic storage devices, and other storage devices. A fixed mass storage 1320 can also, for example, provide additional data storage capacity. The most common example of mass storage 1320 is a hard disk drive. Mass storage 1312, 1320 generally store additional programming instructions, data, and the like that typically are not in active use by the processor 1302. It will be appreciated that the information retained within mass storage 1312 and 1320 can be incorporated, if needed, in standard fashion as part of memory 1310 (e.g., RAM) as virtual memory.

In addition to providing processor 1302 access to storage subsystems, bus 1314 can also be used to provide access to other subsystems and devices. As shown, these can include a display monitor 1318, a network interface 1316, a keyboard 1304, and a pointing device 1306, as well as an auxiliary input/output device interface, a sound card, speakers, and other subsystems as needed. For example, the pointing device 1306 can be a mouse, stylus, track ball, or tablet, and is useful for interacting with a graphical user interface.

The network interface 1316 allows processor 1302 to be coupled to another computer, computer network, or telecommunications network using a network connection as shown. For example, through the network interface 1316, the processor 1302 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 1302 can be used to connect the computer system 1300 to an external network and transfer data according to standard protocols. For example, various process embodiments disclosed herein can be executed on processor 1302, or can be performed across a network such as the Internet, intranet networks, or local area networks, in conjunction with a remote processor that shares a portion of the processing. Additional mass storage devices (not shown) can also be connected to processor 1302 through network interface 1316.

An auxiliary I/O device interface (not shown) can be used in conjunction with computer system 1300. The auxiliary I/O device interface can include general and customized interfaces that allow the processor 1302 to send and, more typically, receive data from other devices such as microphones, touch-sensitive displays, transducer card readers, tape readers, voice or handwriting recognizers, biometrics readers, cameras, portable mass storage devices, and other computers.

The computer system shown in FIG. 13 is but an example of a computer system suitable for use with the various embodiments disclosed herein. Other computer systems suitable for such use can include additional or fewer subsystems. In addition, bus 1314 is illustrative of any interconnection scheme serving to link the subsystems. Other computer architectures having different configurations of subsystems can also be utilized.

The units described above can be implemented as software components executing on one or more general purpose processors, as hardware such as programmable logic devices, and/or Application Specific Integrated Circuits designed to perform certain functions or a combination thereof. In some embodiments, the units can be embodied by a form of software products which can be stored in a nonvolatile storage medium (such as optical disk, flash storage device, mobile hard disk, etc.), including a number of instructions for making a computer device (such as personal computers, servers, network equipment, etc.) implement the methods described in the embodiments of the present invention. The units may be implemented on a single device or distributed across multiple devices. The functions of the units may be merged into one another or further split into multiple sub-units.

The methods or algorithmic steps described in light of the embodiments disclosed herein can be implemented using hardware, processor-executed software modules, or combinations of both. Software modules can be installed in random-access memory (RAM), memory, read-only memory (ROM), electrically programmable ROM, electrically erasable programmable ROM, registers, hard drives, removable disks, CD-ROM, or any other forms of storage media known in the technical field.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for scheduling virtual disk input and output (I/O) ports, comprising:
   assigning a set of service quality ratings to a corresponding set of virtual disk I/O ports based on a set of reading-writing bandwidth quotas associated with the corresponding set of virtual disk I/O ports in a physical machine;
   determining a total forecast value of a data bandwidth to be used by a plurality of reading-writing requests within a current time segment and determining virtual disk I/O ports corresponding to the plurality of reading-writing requests;
   allocating reading-writing bandwidth limits to the virtual disk I/O ports corresponding to the plurality of reading-writing requests, including allocating the total forecast value of the data bandwidth to different virtual disk I/O ports according to a proportion of a service quality rating of a virtual disk I/O port of the total forecast value, wherein the allocating of the reading-writing bandwidth limits to the virtual disk I/O ports comprises:
      allocating a first token container bucket to a first virtual disk I/O port, the first token container bucket comprising a plurality of token containers, and a capacity of each token container corresponding to a size of a corresponding reading-writing bandwidth limit allocated to the first virtual disk I/O port used to control scheduling of the virtual disk I/O ports; and
   scheduling virtual disk I/O ports on the physical machine based at least in part on actual bandwidths to be used by the plurality of reading-writing requests within the current time segment and the reading-writing bandwidth limits for the virtual disk I/O ports corresponding to the plurality of reading-writing requests, wherein the scheduling of the virtual disk I/O ports comprises:
      determining whether a number of bytes associated with the actual bandwidths to be used by the plurality of reading-writing requests for the current time segment exceeds a total capacity of the first token container bucket and
in response to a determination that the number of bytes for the current time segment exceeds the total capacity of the first token container bucket:
delaying to perform the plurality of reading-writing requests until a total capacity of the first token container bucket in a subsequent time segment can accommodate the number of bytes.

2. The method as described in claim 1, wherein an assigned service quality rating relates proportionally to a reading-writing bandwidth quota of each virtual disk I/O port.

3. The method as described in claim 1, wherein a sum of data bandwidth actually generated by a plurality of reading-writing requests in a previous time segment serves as the total forecast value of the data bandwidth to be used by the plurality of reading-writing requests within the current time segment.

4. The method as described in claim 1, wherein the allocating of the reading-writing bandwidth limits comprises:
independently allocating reading bandwidth limits and writing bandwidth limits according to reading requests and writing requests respectively.

5. The method as described in claim 4, wherein a ratio of a reading bandwidth limit and a writing bandwidth limit allocated to a corresponding I/O port corresponds to a ratio of a volume of data read from a virtual disk and a volume of data written into a virtual disk.

6. The method as described in claim 1, wherein the capacity of each token container is proportional to the service quality ratings of the corresponding virtual disk I/O ports.

7. The method as described in claim 1, wherein the token container buckets allocated to the different virtual disk I/O ports include a same number of token containers.

8. The method as described in claim 1, wherein the allocating of the reading-writing bandwidth limits to the virtual disk I/O ports comprises:
adjusting in real-time distribution of token containers in the token container bucket corresponding to each virtual disk I/O port based on reading-writing requests in different time segments.

9. The method as described in claim 8, wherein a real-time capacity of the token container bucket corresponding to each virtual disk I/O port is no greater than a quota capacity of the corresponding token container bucket.

10. The method as described in claim 9, wherein the scheduling of the virtual disk I/O ports on the physical machine comprises:
providing token container compensation between different token container buckets of different virtual disk I/O ports.

11. The method as described in claim 1, wherein the allocating of the reading-writing bandwidth limits to the virtual disk I/O ports comprises:
in the event that a change in quantity of virtual disk I/O ports occurs in the physical machine, re-allocating reading-writing bandwidth limits based on a total forecast value of data bandwidths of virtual disk I/O ports after the change in quantity of virtual disk I/O ports occurs.

12. The method as described in claim 1, wherein prior to the scheduling of the virtual disk I/O ports on the physical machine, the method comprises generating weighted request queues based on correspondence of the plurality of reading-writing requests and requests for the virtual disk I/O ports to access the plurality of reading-writing requests in chronological order from the weighted request queues.

13. A device for scheduling virtual disk input and output (I/O) ports, comprising:
at least one processor configured to:
assign a set of service quality ratings to a corresponding set of virtual disk I/O ports based on a set of reading-writing bandwidth quotas associated with the corresponding set of virtual disk I/O ports in a physical machine;
determine a total forecast value of a data bandwidth to be used by a plurality of reading-writing requests within a current time segment and determine virtual disk I/O ports corresponding to the plurality of reading-writing requests;
allocate reading-writing bandwidth limits to the virtual disk I/O ports corresponding to the plurality of reading-writing requests, including allocating the total forecast value of the data bandwidth to different virtual disk I/O ports according to a proportion of a service quality rating of a virtual disk I/O port of the total forecast value, wherein the allocating of the reading-writing bandwidth limits to the virtual disk I/O ports comprises to:
allocate a first token container bucket to a first virtual disk I/O port, the first token container bucket comprising a plurality of token containers, and a capacity of each token container corresponding to a size of a corresponding reading-writing bandwidth limit allocated to the first virtual disk I/O port used to control scheduling of the virtual disk I/O ports; and
schedule virtual disk I/O ports on the physical machine based at least in part on actual bandwidths to be used by the plurality of reading-writing requests within the current time segment and the reading-writing bandwidth limits for the virtual disk I/O ports corresponding to the plurality of reading-writing requests, wherein the scheduling of the virtual disk I/O ports comprises to:
determine whether a number of bytes associated with the actual bandwidths to be used by the plurality of reading-writing requests for the current time segment exceeds a total capacity of the first token container bucket; and
in response to a determination that the number of bytes for the current time segment exceeds the total capacity of the first token container bucket:
delay performing the plurality of reading-writing requests until a total capacity of the first token container bucket in a subsequent time segment can accommodate the number of bytes; and
a memory coupled to the at least one processor and configured to provide the at least one processor with instructions.

14. The device as described in claim 13, wherein the allocating of the reading-writing bandwidth limits comprises:
independently allocating reading bandwidth limits and writing bandwidth limits according to reading requests and writing requests respectively.

15. The device as described in claim 14, wherein a ratio of a reading bandwidth limit and a writing bandwidth limit allocated to a corresponding I/O port corresponds to a ratio of a volume of data read from a virtual disk and a volume of data written into a virtual disk.

16. The device as described in claim 13, wherein the allocating of the reading-writing bandwidth limits to the virtual disk I/O ports comprises:
   adjusting in real-time distribution of token containers in the token container bucket corresponding to each virtual disk I/O port based on reading-writing requests in different time segments.

17. The device as described in claim 16, wherein the scheduling of the virtual disk I/O ports on the physical machine comprises:
   providing token container compensation between different token container buckets of different virtual disk I/O ports.

18. The device as described in claim 13, wherein the allocating of the reading-writing bandwidth limits to the virtual disk I/O ports comprises:
   in the event that a change in quantity of virtual disk I/O ports occurs in the physical machine, re-allocating reading-writing bandwidth limits based on a total forecast value of data bandwidths of virtual disk I/O ports after the change in quantity of virtual disk I/O ports occurs.

19. A computer program product for scheduling virtual disk input and output (I/O) ports, the computer program product being embodied in a tangible non-transitory computer readable storage medium and comprising computer instructions for:
   assigning a set of service quality ratings to a corresponding set of virtual disk I/O ports based on a set of reading-writing bandwidth quotas associated with the corresponding set of virtual disk I/O ports in a physical machine;
   determining a total forecast value of a data bandwidth to be used by a plurality of reading-writing requests within a current time segment and determining virtual disk I/O ports corresponding to the plurality of reading-writing requests;
   allocating reading-writing bandwidth limits to the virtual disk I/O ports corresponding to the plurality of reading-writing requests, including allocating the total forecast value of the data bandwidth to different virtual disk I/O ports according to a proportion of a service quality rating of a virtual disk I/O port of the total forecast value, wherein the allocating of the reading-writing bandwidth limits to the virtual disk I/O ports comprises:
   allocating a first token container bucket to a first virtual disk I/O port, the first token container bucket comprising a plurality of token containers, and a capacity of each token container corresponding to a size of a corresponding reading-writing bandwidth limit allocated to the first virtual disk I/O port used to control scheduling of the virtual disk I/O ports; and
   scheduling virtual disk I/O ports on the physical machine based at least in part on actual bandwidths to be used by the plurality of reading-writing requests within the current time segment and the reading-writing bandwidth limits for the virtual disk I/O ports corresponding to the plurality of reading-writing requests wherein the scheduling of the virtual disk I/O ports comprises:
   determining whether a number of bytes associated with the actual bandwidths to be used by the plurality of reading-writing requests for the current time segment exceeds a total capacity of the first token container bucket; and
   in response to a determination that the number of bytes for the current time segment exceeds the total capacity of the first token container bucket:
   delaying to perform the plurality of reading-writing requests until a total capacity of the first token container bucket in a subsequent time segment can accommodate the number of bytes.

\* \* \* \* \*

UNITED STATES PATENT AND TRADEMARK OFFICE
CERTIFICATE OF CORRECTION

PATENT NO. : 10,649,664 B2
APPLICATION NO. : 16/133506
DATED : May 12, 2020
INVENTOR(S) : Xiaobo Li, Weicai Chen and Bo Chen Page 1 of 1

It is certified that error appears in the above-identified patent and that said Letters Patent is hereby corrected as shown below:

In the Specification

In Column 5, Line(s) 45, after "(Wi)", insert --is--.

In the Claims

In Column 22, Claim 19, Line(s) 24, after "requests", insert --,--.

Signed and Sealed this
Fifteenth Day of December, 2020

Andrei Iancu
*Director of the United States Patent and Trademark Office*